United States Patent

[11] 3,561,652

| [72] | Inventor | Lewis L. Ruter<br>218 26th Ave. N. Apt. #7, Minneapolis,<br>Minn. 55411 |
|---|---|---|
| [21] | Appl. No. | 785,257 |
| [22] | Filed | Dec. 19, 1968 |
| [45] | Patented | Feb. 9, 1971 |

[54] FLOATING FISH STRINGER
8 Claims, 7 Drawing Figs.

[52] U.S. Cl. .......................................................... 224/7
[51] Int. Cl. ....................................................... A01k 65/00
[50] Field of Search........................................... 224/7A-
—7C, 7.1, 7.11; 9/8, 10; 43/43.1, 43.12; 4/172, 172.15

[56] References Cited
UNITED STATES PATENTS

| 292,281 | 1/1884 | Brewster ..................... | (43/43.1UX) |
| 2,004,247 | 6/1935 | McCaul ........................ | 224/7(.1) |
| 2,062,386 | 12/1936 | Withey ......................... | 224/7(.1) |
| 2,852,173 | 9/1958 | Milner, Sr. ................... | 224/7(.1) |
| 3,269,622 | 8/1966 | Wood ............................ | 224/7(.11) |
| 3,482,747 | 12/1969 | Jones............................. | 224/7(.11) |

FOREIGN PATENTS

| 551,172 | 1/1958 | Canada ........................ | 43/43.1 |
| 382,726 | 11/1932 | Great Britain................ | 9/8 |

Primary Examiner—Robert G. Sheridan
Assistant Examiner—Frank E. Werner
Attorney—Burd, Braddock & Bartz ABSTRACT: A fish stringer comprising an elongated chain carrying a plurality of flotation units and spaced safety pin hooks. A lockring carrying a tag is attached to the upper links of the chain to hold the flotation units in assembled relation with the chain.

PATENTED FEB 9 1971 3,561,652

INVENTOR.
LEWIS L. RUTER
BY
Burd, Braddock & Bartz
ATTORNEYS

FLOATING FISH STRINGER

BACKGROUND OF INVENTION

Metal chain and synthetic fish stringers are commonly used by fishermen to hold landed fish. One of the disadvantages of these stringers is that if they are detached from the boat or other anchor, they will sink with the resultant loss of the fish and stringer. The object of the invention is to provide a fish holding stringer with flotation units which prevent the stringer from sinking in the event that the stringer becomes detached from its anchor. A further object of the invention is to provide a floating fish stringer which is easy and economical to manufacture and effective in use.

SUMMARY OF INVENTION

The invention relates to a fish holding line combined with flotation means for holding the line near the surface of a body of water. The flotation means are assembled on the line so that the line and flotation means are a single item. The line extends through the holes in the flotation means. A lock member larger than the holes in the flotation means is attached to an end portion of the line to hold the flotation means in assembled relation with the chain.

DESCRIPTION OF THE DRAWING:

Referring to FIG. 1, there is shown the floating fish stringer of the invention indicated generally at 10 attached to a boat 11 floating in a body of water 12 as a lake, river and the like. Positioned in the boat is a fisherman 13 who has landed a fish 14 attached to the stringer 10.

A connector 16, shown as a safety pin-type hook, connected to the upper end of a float or lead line 17 is used to attach the stringer to the boat. Carried on lead line 17 are a plurality of substantially identical flotation units or floats 18A, 18B, 18C, 18D and 18E which have sufficient buoyancy to hold the fish stringer as well as any fish attached to the stringer near the surface of the water. Flotation units are assembled on lead line 17 which is connected to main or fish line 19 with a swivel connector indicated generally at 22. The main line 19 carries a plurality of spaced fish holding safety pin hooks 21. As shown in FIG. 5, the swivel connector 22 has an upper hook 23 connected to the end of line 17 and a ring 24 rotatably connected to the hook 23 and extended through the upper link of the main line 19. Hook 23 can be opened, as shown in broken line in FIG. 5, to disconnect line 17 from main line 19. With the line 17 disconnected form hook 23 the flotation units 18A—18E can be readily placed on the line. After all the flotation units are on the line hook 23 is placed on and closed over the end portion of the line thereby holding all the flotation units on the line. The ring 24 has a maximum width greater than the diameter of the hole in the last flotation unit to act as a stop for this flotation unit.

The term "line" includes but is not limited to a flexible cord, wire cable, link chain, rope, woven fabric or plastic strand cord, chain link and hook combinations and the like.

Figure 1:
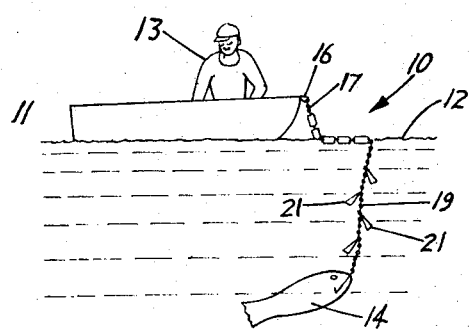
FIG. 1 is a diagrammatic view of a fisherman in a boat equipped with the floating fish stringer of the invention.
Figure 4:
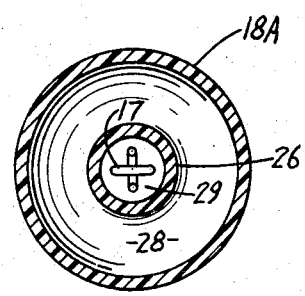
FIG. 4 is an enlarged sectional view taken along the line 4—4 of FIG. 3.
Figure 3:
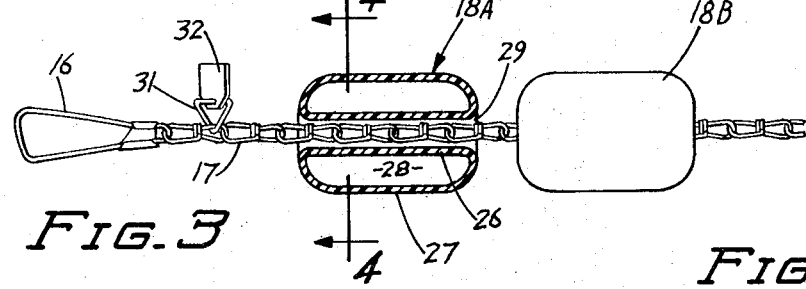
FIG. 3 is an enlarged view of the upper end of the stringer with one flotation unit in section.
Figure 2:
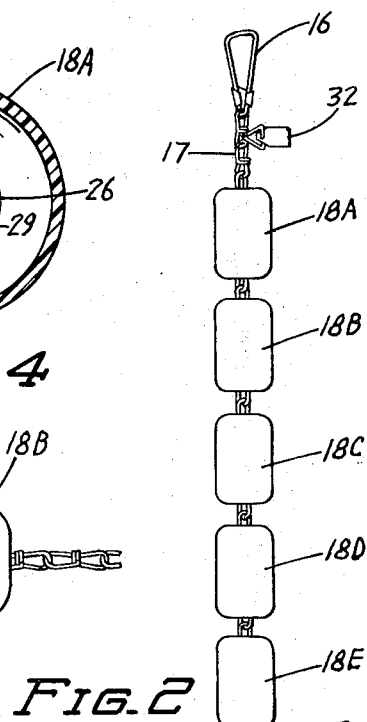
FIG. 2 is a plan view of the fish stringer of the invention.

As shown in FIGS. 3 and 4, the flotation unit 18A is an elongated cylindrical member having a cylindrical inner wall 26 and a cylindrical outer wall 27 spaced outwardly from and extended around wall 26. The ends of walls 26 and 27 are connected forming an annular air chamber 28. Extended along the longitudinal axis through the unit is a central hole 29 of the diameter larger than the maximum width of the line 17 so that the flotation unit is free to move longitudinally along the line.

Attached to the penultimate link of the line 17 is a lockring 31 carrying an indicia bearing tag 32. Lockring 31, a triangular member extended through one of the upper links of line 17, has a maximum width which is greater than the diameter of the hole 29. The ring 31 acts as a stop holding the flotation unit 18A on the line 17. With the ring 31 spaced from the connector 16 and the first link of the line 17 damage to these members and/or the unfastening of the connector from the line 17 will not release the flotation units 18A—18E form the lead line 17.

A preferred embodiment of the flotation unit is a rigid plastic member having a maximum diameter of 2½inches and a length of 3¾ inches. The longitudinal hole through the unit has a diameter of one-half inch and allows complete longitudinal freedom for a three-eighths inch width chain. The lockring is a five-eights inch rectangular ring projected through a hole in a flat tag 32. The flotation units are made of rigid, light reflecting plastic material preferably of the colors white, red, blaze green, blaze orange or a combination thereof so as to provide visual identification of a loose or detached fish stringer. The flotation units may be two piece cup-shaped members joined together.

Figure 6:
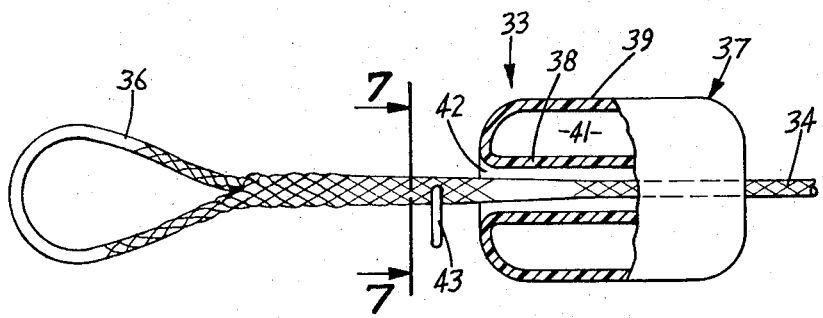
FIG. 6 is a fragmentary view of a modified stringer carrying a flotation unit partly sectioned.
Figure 7:
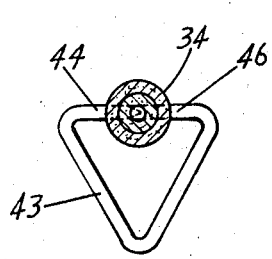
FIG. 7 is an enlarged sectional view taken along the line 7—7 of FIG. 6.
Figure 5:
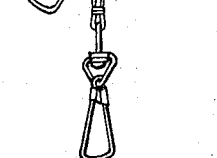
FIG. 5 is an enlarged view of the swivel connection between the float line and fish line.

Referring to FIGS. 6 and 7, there is shown a modified stringer 33 having a combined lead line 34 and loop 36. POsitioned about lead line 34 is a flotation unit 37. Additional flotation units can be added to line 34 as required to hold the stringer at the surface of the water. Each flotation unit has an inner cylindrical wall 38 and an outer cylindrical wall 38 having closed ends defining an annular air chamber 41. A longitudinal central hole 42 extends longitudinally through the flotation unit to accommodate the lead line 34. Referring to FIG. 7, the lead line is a woven cylindrical cord with the loop 36 formed by placing the end of the cord back in the central portion of the cylindrical cord so that when tension or pulling forces are placed on the cord, the cord will embrace the turned-in end to provide a tight loop connection. To facilitate the insertion of the end into the center of the cord, the end is placed in a short metal tube. The tube with the end is inserted between the strands longitudinally into the cord. When the end is placed about 2 inches into the cord the tube is separated from the end leaving the end in the center of the cord.

To facilitate the assembly of the flotation unit 37 on the lead line 34, the loop 36 is placed in the line after all the flotation units are placed on the line 34. To prevent the flotation unit 37 from moving over the loop 36, a lockring 43 is attached to the lead line 34. As shown in FIG. 7, the lockring is a triangular member having inwardly directed ends 44 and 46 which extend through the line and the turned-in end of the line to thereby hold the end in assembled relation with the line as well as anchor the lockring to the line. The lockring 43 has a width which is greater than the diameter of the hole 42 in the flotation unit 37 so that the flotation unit is held on the line independently of the loop 36. The opposite end of line 34 can have a loop similar to loop 36 and a lockring similar to ring 42 to prevent separation of the flotation units from the line.

I claim:

1. In combination: an elongated line having a first end and a second end, a plurality of flotation units movably mounted end-to-end relative to each other on the line between said ends of the line, each of said flotation units having a longitudinal central passage and at least one annular enclosed air chamber, said passage in each flotation unit having a diameter greater than the thickness of the line whereby the flotation units are free to rotate and move along the line, first stop means larger than said passages connected to said line adjacent the first end of the line to prevent said flotation units from separating from said line, a connector attached to said second end adapted to attach the line to an anchor, second stop means connected to said line and spaced form the connector, said second stop means being larger than the passage in the flotation unit, thereby preventing the flotation units from engaging the connector and separating from the line, and elongated means having fish holding means connected to said second stop means.

2. The combination of claim 1 wherein: the second stop means is a swivel connector, said elongated means coupled to said swivel connector to turn independently of the elongated line.

3. The combination of claim 1 wherein: the line is a first chain, said elongated means connected to the first means is a second chain, and said fish holding means comprise a plurality of safety pin hooks connected to the second chain.

4. The combination of claim 1 wherein: the line is a woven cord, said connector being a loop in one end of the cord.

5. The combination of claim 4 wherein: the second stop means is a ring having a portion extended through the line.

6. The combination of claim 1 wherein: the line is a chain, said first stop means is a swivel connector, said connector attached to said second end being a safety pin hook, and said second stop means being a ring attached to a link of the chain spaced from the hook.

7. The combination of claim 6 wherein: the elongated means is a second chain connected to the swivel connector and said fish holding means comprise safety pin hooks attached to the second chain.

8. The combination of claim 1 wherein: the line is a woven cord, said first means comprising a first loop at said one end of the line, a first ring having a portion extended through the line adjacent the first loop to prevent the flotation units from separating from the line, said connector being a second loop attached to the second end of the line, said second stop means comprising a second ring having a portion extended through the line adjacent the second loop to prevent separation of the anchoring means from the line.